(12) United States Patent
Tonge et al.

(10) Patent No.: US 7,079,145 B2
(45) Date of Patent: Jul. 18, 2006

(54) METHOD AND PROGRAM SOLVING LCPS FOR RIGID BODY DYNAMICS

(75) Inventors: Richard Tonge, St. Louis, MO (US); Lihua Zhang, Chesterfield, MO (US); Dilip Sequeira, St. Louis, MO (US)

(73) Assignee: AGEIA Technologies, Inc., Mountain View, CA (US)

( * ) Notice: Subject to any disclaimer, the term of this patent is extended or adjusted under 35 U.S.C. 154(b) by 135 days.

(21) Appl. No.: 10/793,899

(22) Filed: Mar. 8, 2004

(65) Prior Publication Data

US 2005/0162433 A1 Jul. 28, 2005

Related U.S. Application Data

(60) Provisional application No. 60/537,954, filed on Jan. 22, 2004.

(51) Int. Cl.
*G06T 15/70* (2006.01)

(52) U.S. Cl. .............. 345/473; 345/474; 345/644; 345/419; 708/446

(58) Field of Classification Search ............... 345/419, 345/473, 475, 474, 644; 708/446
See application file for complete search history.

(56) References Cited

U.S. PATENT DOCUMENTS

2003/0179205 A1* 9/2003 Smith et al. ............ 345/474

OTHER PUBLICATIONS

Zhu "Iterative Methods for Solving Linear Variational Inequality", IEEE 1993, pp. 343-348.*

* cited by examiner

*Primary Examiner*—Kimbinh T. Nguyen
(74) *Attorney, Agent, or Firm*—Volentine, Francos & Whitt PLLC

(57) ABSTRACT

A projected iterative descent method is used to resolve LCPs related to rigid body dynamics, such that animation of the rigid body dynamics on a display system occur in real-time.

45 Claims, 3 Drawing Sheets

$$\begin{pmatrix} x \\ x_1 \\ x_2 \\ \bullet \\ \bullet \\ \bullet \\ x_n \end{pmatrix} \begin{pmatrix} u \\ u_1 \\ u_2 \\ \bullet \\ \bullet \\ \bullet \\ u_n \end{pmatrix} \begin{pmatrix} j \\ j_{11} \; j_{12} \bullet \bullet \bullet \\ j_{21} \\ \bullet \quad\quad \bullet \\ \bullet \quad\quad \bullet \\ \bullet \quad\quad \bullet \\ j_{n1} \bullet \bullet \bullet j_{nn} \end{pmatrix} \begin{pmatrix} b \\ b_1 \\ b_2 \\ \bullet \\ \bullet \\ \bullet \\ b_n \end{pmatrix}$$ ROW CONSTRAINT 20

FIG. 2

METHOD AND PROGRAM SOLVING LCPS FOR RIGID BODY DYNAMICS

This application claims the benefit of U.S. Provisional Patent Application No. 60/537,954 filed Jan. 22, 2004.

BACKGROUND OF THE INVENTION

The present invention relates to a method and program for realistically animating the motion and interaction of rigid bodies in a display system. More particularly, the present invention relates to a method and program for solving a class of Linear Complementary Problems (LCPs) that arise during operation of a rigid body dynamics engine within the display system. The present invention finds application within conventional display systems, as well as within recently proposed display systems incorporating a hardware-based, physics processing unit.

Physics-based "animations" and "simulations" (hereafter these terms are used interchangeably regardless of application, specific method of display, or means of communicating related physics-based data) have been extensively investigated during the past three decades. Such animations are useful in a range of applications including virtual reality, electronic/computer games, scientific simulations, and robotic motion planning. Game developers, for example, increasingly use real-time, physics-based animations to enhance the realism of game object interactivity. Integral to the development of real-time, physics-based animations is the dynamic simulation of rigid body movements and interactions.

The term "rigid body" is used to describe animated objects that do not deform. They are said to be stiff even when colliding with other objects or with the environment defined by the animation. A rigid body simulation involves a complex sequence of computational steps causing animated bodies and related forces to interact in a realistic manner according to a set of defined physical rules, or so-called "constraints." One goal of a rigid body simulator is to minimize or prevent the penetration of objects. If a simulator were to allow large penetrations of objects, then the illusion of object rigidity would be lost.

The practical development of physics-based animations, including rigid body simulations, has proved quite difficult. For simple cases, continuous real life problems can be written using continuous mathematics and solved algebraically. This approach is to high school physics students. However, the set of cases which have algebraic solutions is very small and a rigid body simulator must be able to handle any configuration of contacting rigid bodies. For this reason, a discrete problem is chosen that approximates the continuous problem. A discrete problem can be represented with a finite amount of data and can be evaluated numerically (by a computer) at discrete time intervals. Given that frames of animation are only required at discrete time intervals, this is an acceptable limitation.

Selecting a discrete model that approximates a sufficiently large class of continuous problems and is solvable in real time by a computer is difficult. A poor choice of discrete model can result in behavior that diverges unacceptably from the original continuous problem. For example with a bad model, objects might jump around for no reason, penetrate unacceptably, fall through a floor, or fly off into infinity.

At least in the context of computer games, the accuracy of the discretization with respect to the continuous problem is not particularly important. This result arises because unlike simulations used in science and engineering, computer game simulations need not be predictive. Any plausible discrete model will do. However, although this relaxed requirement makes it easier to meet the real-time constraint, it unfortunately doesn't make the mathematics any easier.

Numerous issues must be addressed when building a display system adapted to run real-time, physics-based animations. For example, the geometry of objects plays an important role in determining the physics of motion, as well as the physics of contact between objects. An object may be a single rigid body such as a chair or house, or may consist of a number of connected (e.g., jointed) bodies, such as a human figure. Collision or contact between objects must be accurately determined. Solving the necessary equations of motion to realistically animate objects has proved to be a difficult problem since accuracy (i.e., realism) and computational speed are always at odds.

In addition to preventing object/object or object/environment penetration, a display system implementing rigid body simulation must also take various physical properties of the objects into account when determining their motion. An example of such a property is mass. Further, physics-based animations must faithfully track and account for forces, such as gravity, acting upon objects. A rigid body simulator, or "engine," associated with the display system must also create the illusion that simulated objects have certain surface properties, such as friction.

As one might expect, the modeling and simulation of the complexities arising from varied object geometries, interacting objects and forces, and changing object constraints requires a great deal of sophisticated mathematics. However, the mathematics implicated in the present invention are conventional. That is, those of ordinary skill in the art will understand the mathematical bases upon which the present invention is predicated. It is neither appropriate nor required that this present description try to teach the entire body of implicated mathematics. Nevertheless, some discussion of a mathematical model is required in order to establish a common descriptive vocabulary for the teachings that follow.

The conventional resources typically available in a display system implementing physics-based animations are conceptually illustrated in FIG. 1. Within FIG. 1, resources primarily based in hardware are shown in solid outline while software resources are shown in dotted outline. Those of ordinary skill in the art will recognize that such hardware/software designations are relatively arbitrary. For example, computational logic may be fully implemented in software or hardwired into a logic device at a system designer's discretion. However, some logical distinction between hardware and software, as exemplified by current best practices, is useful in the description that follows.

In FIG. 1, a Central Processing Unit (CPU) 1, such as a Pentium® microprocessor, together with its associated drivers and internal memory, access data from an external memory 11, and/or one or more peripheral devices 13, typically including a display. The terms "internal" and "external" are used to generally differentiate between various memories in relation to the other computational components in a system. Such differentiation is clearly relative, since most internal memory can be turned into external memory and vice verses. Generally speaking, however, an internal memory will typically be co-located on the same chip as related computational component(s), while external memory will typically be implemented using a separate chip or chip set.

A main application 4 is resident in external memory 2 and/or peripheral 13 (e.g., a magnetic or optical disk, a solid-state memory device such as a PROM, EPROM, or EEPROM, a cartridge for a game console or similar device). Main program 4 typically uses one or more Application Programming Interfaces (APIs) to access blocks of specialty software associated with various program functions. An API is a well understood programming technique used to establish a lexicon of sorts by which one piece of software may "call" another piece of software. The term "call" as variously used hereafter broadly describes any interaction by which one piece of software causes the retrieval, storage, indexing, update, execution, etc., of another piece of software.

Data instructions, often in a prescribed packet form and referred to hereafter as "commands," are generally used to initiate calls between one or more software or hardware components. Execution (i.e., "running") of software, in any of its various forms including micro-code, occurs upon receipt of an appropriate command.

Conventional display systems implementing physic-based animations routinely include or incorporate by functional "call" a related piece(s) of specialty software referred to generically hereafter as a "physics engine." A physics engine may be thought of as an operative collection of resources, including specialized software, implementing realistic, real-time (or near real-time) physics effects within a main application.

With the recent and growing appetite for realism, physics engines have been added to the program code implementing, for example, PC games. Indeed, a market has emerged directed to the development physics engines or so-called "physics middleware." Companies like HAVOK, MathEngine, Criterion, and Meqon Research have developed specialty software that may be called by a main application to better incorporate natural looking, physics-based interactions into a main application.

Prior to the use of physics engines in games, objects were animated by hand. These animations were triggered in response to input from the user. For example, if the user pressed a punch key, the game would play a corresponding punch animation. If the user pressed the punch key while standing next to a pile of boxes, then an animation of the pile of boxes falling over might have been played. If the user pressed the punch key while standing next to a game character, an animation of that character falling to the floor might have been played.

Since the animated motion displayed by the game was specified by a set of "pre-drawn" animations, the punch, the falling boxes, and the falling character would each move in the same manner every time. As well as being quite boring for the user, the animation could not take into account the context of the action. For example, if the user pressed the punch key next to a wall, there would often be nothing to stop the player's arm going through the wall. If the user had previously parked a car behind the pile of boxes, the boxes would typically fall through the car. If the user punched a character next to a cliff, the punched character would typically fall flat and lie in midair over the cliff rather than falling over the cliff ledge.

These problems were overcome to a certain extent by limiting the actions of the user, for example by not giving the user a car to drive, not allowing the user to walk within arm's length of a wall and not allowing fights next to cliffs. These restrictions were often frustrating to the user. Another way around the problem was to simply generate outcome animations for every possible combination of user actions. However, as the number of possible user actions grows, the number of outcome animations outcomes also grows. Thus, as game complexity increases the cost associated with the development of multiple animations becomes prohibitive.

Games designed using only animation start with a completely restricted environment where nothing unscripted can happen. This completely restricted environment is gradually made more interactive as an animator produces more and more animations. In contrast, games designed using physics-based approaches start with the opposite point of view, namely objects initially have complete freedom of motion. The game designer then, for example, designs a solid environment and adds a constraint that objects can still move with complete freedom, except that they must not fall through the solid environment. In a physics-based game, there is no reason why the user can't be given a car, or be allowed to punch a person next to a cliff, so those constraints are never introduced. As the game design progresses, some additional constraints are added however, as most fun games have rules.

Rather than supplying a set of animations for each object, the game designer specifies a set of physical properties for the object such as mass, friction, and in some cases even elasticity. The physics engine then uses the laws of physics to move the objects as if they had these properties such that they don't violate the specified constraints. The designer of a game incorporating physics-based animation decides which forces and torques should be applied to the objects in response to the user's input.

Of necessity, physics engines include a rigid body dynamics engine adapted to calculate the movement of rigid bodies within an animation. As will be appreciated by those of ordinary skill in the art, a rigid body dynamics engine will typically form one aspect of a larger physics engine. The exact programming and/or resource boundaries between the rigid body dynamics engine and other effects engines within the physics engine are a matter of design choice, and it is expected that the rigid body dynamics engine will draw upon a library of functions and/or a pool of common resources provided by the physics engine and/or by the main application.

Unfortunately, contemporary physics engines have significant limitations as to the number of objects in an animated scene, and more particularly, the number of active (i.e., moving or interacting) objects. Realistic visual images of simulated physics interaction must account for constraints placed upon many or all of the objects. As noted above, a constraint is a restriction on the possible movement or interaction of an object (e.g., a door hinge, a knee joint, a dog on a leash). Increasing complexity of terrain geometry greatly increases the difficulty of simulating object interactions with the terrain. The complexity of collision detection and resolution also increases with the complexity of an object's surface geometry (i.e., its surface detail).

Along with an increasing number of active objects, cutting edge animations and simulations demand an increased number of forces being applied to the objects. These aggregate demands are further aggravated by the increasing number of "time steps" per second being used in animations (i.e., the frequency with which the animated world with all its objects and forces is updated in real time).

However, among the factors challenging the realistic, real-time animation of objects in a physics-based application, the definition and incorporation of constraints upon the animated rigid body objects has proved most difficult. Indeed, it the existence of numerous constraints that makes the underlying mathematical (numerical analysis) problem much more difficult to resolve, as compared with a simple application of Newton's laws of motion.

One relatively older, conventional approach, generally referred to as the "extended coordinates method," to the problem of solving physics-based constraint problems expresses constraints using Lagrange multipliers that correspond to forces that effectively maintain the constraints within the animated world space. See, for example, R. Bazel and A. Barr "A modeling system based on dynamic constraints," *Proceedings in SIGGRAPH* 1988, Vol. 22, pp. 179–188 (1988). In such an approach, the Lagrange multipliers result in a large number of variables being used—nearly doubling the variables otherwise required to describe the animation. This increase in constraint-related variables results in an eight-fold increase in the quantity of computational resources required to resolve the animation, as compared with a similar animation lacking constraints.

Performance of the early "constraint-based" approach to rigid body simulation was improved by the incorporation of mathematical techniques taking advantage of the "sparse" nature of the matrixes used to express animation objects, forces, and constraints. See, for example, C. Lubich et al., "Mexx—numerical software for the integration of constrained mechanical multi-body systems," *Technical Report SC92-12, Konrad-Zuse-Zentrum fur Informationstechnik,* (1992).

Other approaches to physic-based, rigid body animation extended these constraint-base methods to handle contact between objects. Incorporating contact within an animation is typically done by formulating the constrained dynamics equations as a Linear Complementary Problem (LCP), which is essentially a problem of finding some solution to a linear system that satisfies certain inequality constraints. P. Lodestadt, "Mechanical systems of rigid bodies subject to unilateral constraints" *SIAM Journal of Applied Mathematics,* 42(2): 281–96 (1982), is exemplary of early papers expressing the contact problem as an LCP. D. Baraff, "Fast contact force computation for non-penetrating rigid bodies," *Proceedings of SIGGRAPH* 1994, Vol. 28, pages 23–34 (1994), later explained the use of an LCP solving algorithm developed by R. W. Cottle and G. B. Dantzig in "Complementary pivot theory of mathematical programming," *Linear Algebra and Application,* 1, (1968).

Early LCP methods proved unreliable because there was no guarantee of the existence of a solution in the presence of contact with Coulomb friction. Indeed, there are known configurations of rigid bodies for which no set of contact and friction forces satisfies all of the constraints. D. E. Stewart and J. C. Trinkle, "An implicit time-stepping scheme for rigid body dynamics with inelastic collisions and coulomb friction," *International Journal of Numerical Methods Engineering,* (1996), resolved this difficulty, at least in part, by proposing a scheme that combined acceleration-level LCP with time stepping to obtain an LCP expressed as velocity and impulse variables. This method guaranteed solvability for a larger class of LCPs, and was later modified by M. Anitescu and F. Potra, "Formulating dynamic multi-rigid-body contact problems with friction as solvable linear complementary problems," *Nonlinear Dynamics,* 14:231–47 (1997). Both of these documents propose use of the Lemke algorithm to solve LCPs. However, both approaches are impractically slow for use within real-time animations and overly prone to large computational errors.

In a more recent work, U.S. patent application Ser. No. 2003/0 179 205 A1 published Sep. 25, 2003 in the name of Smith et al., a rigid body simulator is proposed in which LCPs are solved using Murty's algorithm applied to velocity and position parameters instead of an acceleration parameter. Smith et al. further propose the use of a semi-implicit integration step in which constraint forces are determined by ensuring that the first derivative of the constraint function is zero, as compared with previous approaches which held the second derivative to zero.

Yet, all of the foregoing approaches to the resolution of LCPs arising from consideration of systems containing constrained, rigid bodies remain unsuited for real-time applications, unless such systems are greatly restricted in size and/or complexity. The conventional approaches are simply too slow. This slowness generally results from the use inefficient computational methods and inappropriate data forms.

SUMMARY OF THE INVENTION

The present invention succeeds where all previous approaches to the real-time animation of physics-based interactions between rigid bodies have failed.

In one aspect, the present invention provides a method of operating a display system having a display, a processing unit and a memory. The method is adapted to animate on the display system n objects subject to constraints which remove m degrees of freedom (hereafter, "m constrained degrees of freedom"). The method is characterized by defining and storing system parameters in memory, wherein the system parameters define the objects and at least one constraint acting upon the objects. Following an increment in a defined time step, the method calculates updated system parameters in the processing unit using a projected iterative descent method applied to a Linear Complementarity Problem (LCP) defined in relation to the system parameters, such that animated motion of the objects is determined in relation to the updated system parameters.

In a related aspect, the present invention provides a computational method for solving a Linear Complementarity Problem (LCP) having a form $f=LCP(b, JM^{-1}J^T)$, where the LCP is derived from a data set related to rigid body dynamics and the data set comprises vector b, Jacobian J and Mass matrix M.

The method initializes and maintains f—a candidate solution to the LCP. At each iteration, the method modifies the candidate solution so that it is in some sense closer to a final solution to the LCP. In one preferred embodiment, the iterations continue until the candidate solution is sufficiently close to the final solution as determined by a predetermined difference threshold. In an alternate embodiment, a fixed number of iterations is executed.

Following initialization, the method assigns to f an arbitrary initial candidate solution $f^0$ that lies in the feasible region defined between limits lo and hi, or $lo<f^0<hi$. The method then checks for termination. It then modifies f using a projected iterative descent method. The method iterates until termination.

Termination may be defined by a fixed number of iterations, or by satisfaction of a set of boxed conditions related to the LCP.

In yet another related aspect, the present invention provides a computational method for resolving a Linear Complementarity Problem (LCP) derived from a data set. The data set is defined in relation to a plurality of rigid bodies and one or more constraints defining limitations upon the motion of the rigid bodies. The method applies a projected iterative descent method to data forms derived from the data set during a fixed maximum time period. Of note, the fixed maximum time period allows real-time animation of the dynamic interaction of the rigid bodies on a display system.

In yet another aspect, the present invention provides an iterative method for solving a Linear Complementarity Problem (LCP) having a form LCP (b+Cf, A), C being a constant and f being an arbitrary candidate solution for each method iteration. The LCP is derived from a data set related to rigid body dynamics. The method is characterized by steps that assign an arbitrary, non-negative vector as an initial candidate solution $f^0$ for an initial iteration 0. Then the method solves the LCP by defining a subsequent candidate solution $f^{X+1}$ for an iteration X+1, such that the subsequent candidate solution $f^{X+1}$ is always closer to a final solution than a previous candidate solution $f^X$, for all $f^X$ greater than zero. Iteration continues until a termination test is passed—either execution of a maximum number of iterations, or satisfaction of a set of boxed conditions for the LCP.

In still another aspect, the present invention provides a computational method solving a Linear Complementarity Problem (LCP) derived from a data set. The data set is related to a plurality of dynamically interacting rigid bodies and a plurality of constraints defining limitations on the motion of the plurality of rigid bodies. The computational method comprises defining LCP data from the data set, and solving the LCP by applying a projected iterative descent method to the LCP data.

In yet another aspect, the present invention provides a system comprising at least one processing unit, a memory, and a plurality of peripherals including a display. The system is adapted to animate the motion of a plurality of objects on the display. A program stored in memory causes the system to store a data set in memory. The data set defines physics-based characteristics for the plurality of objects and an initial state of an animation of the plurality of objects. The program also stores constraint parameters in memory. The constraint parameters define at least one constraint function constraining movement of at least one of the plurality of objects in the animation.

The program then calculates in the processing unit velocity and force parameters defining the state of the animation following a time step by applying a projected iterative descent method to the data set in accordance with the constraint parameters.

In a one related aspect, the processing unit calculating the velocity and force parameters comprises a general purpose Central Processing Unit (CPU) for the system. Alternatively, the processing unit comprises a dedicated Physics Processing Unit (PPU) associated with the system.

BRIEF DESCRIPTION OF THE DRAWINGS

In the drawings, like reference characters indicate like elements. The drawings, taken together with the foregoing discussion, the detailed description that follows, and the claims, describe a preferred embodiment of the present invention. The drawings include the following:

FIG. 2 conceptually illustrates a collection of constraint rows useful in the implementation of the present invention;

DETAILED DESCRIPTION OF THE PREFERRED EMBODIMENT(S)

Figure 1:
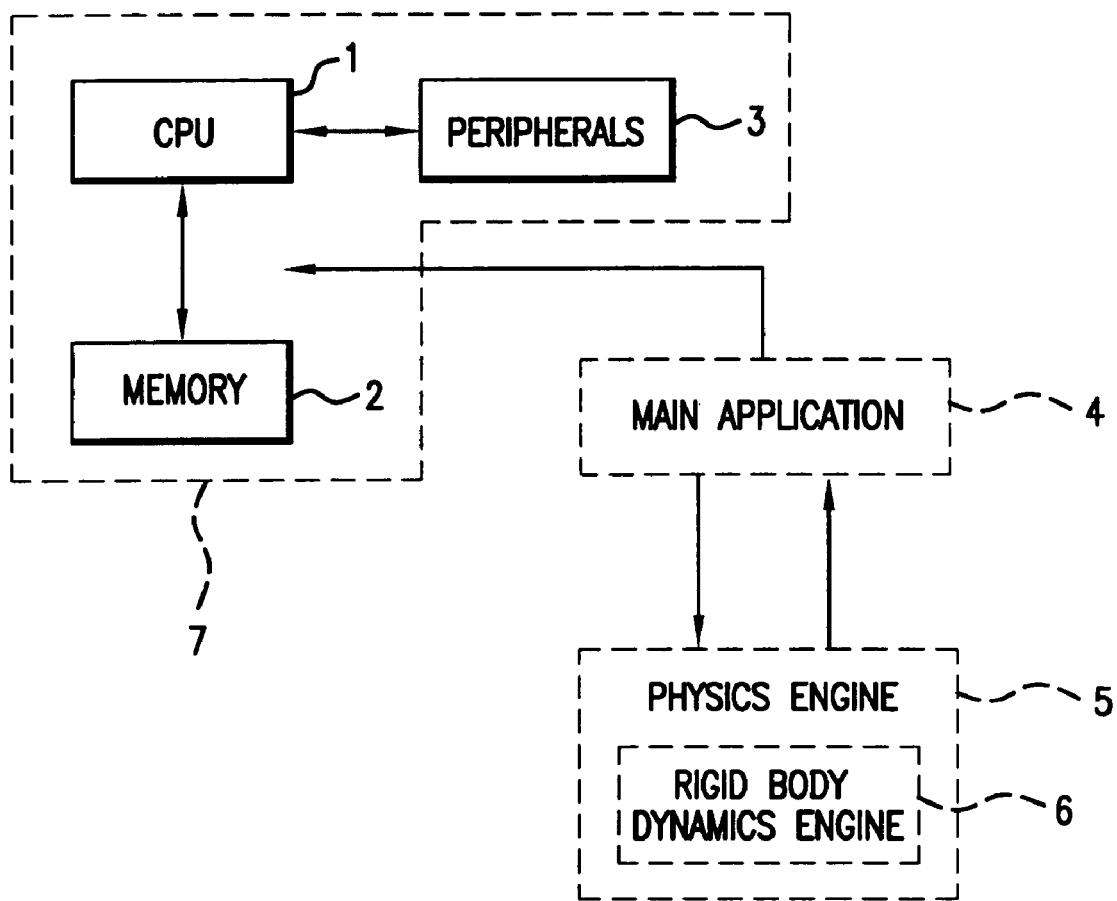
FIG. 1 is a conceptual illustration of a conventional display system capable of running a computational method in accordance with the present invention.

Some additional insight into the failure of previous approaches to the time efficient resolution of LCPs arising from physics-based data serves as a useful transition into a written description of several preferred embodiments of the present invention. As discussed above, many specialized LCP "solvers" have previously been proposed.

Consider, for example, the approach used by the Open Dynamics Engine ("ODE"). See, http://opende.sourceforge.net/. This approach is actually modified version of the computational method described by Dantzig. The animation of a 10 brick-by-10 brick wall collapsing after the impact of a cannon ball serves as a convenient performance benchmark. Unfortunately, such an animation typically takes several or even tens of seconds per animation frame (nominally 16 ms) to resolve using the ODE solver running on a PC having an Intel P4 2 GHz microprocessor. Clearly, such resolution precludes a realistic, real-time animation of the collapsing wall. The LCP's underlying a physics-based animation of the collapsing wall simply can not be resolved quickly enough using the ODE solver. This performance bottleneck will soon become even more serious as next generation physics animations contemplate LCPs ranging in size from 1 by 1, up to 15,000 by 15,000 (i.e., LCPs sufficient to simulate the collapse of 32-by-32 brick wall).

The LCP is essentially a combinatorial problem, in that there are a discrete number of possibilities for the solution. For a boxed LCP of size m, the solution is one of $3^m$ possibilities. This is in contrast to most mathematical problems, for which the solution is one of an infinite number of possibilities. Given one of the possible solutions, a "candidate solution," it is possible to test whether the candidate solution is the solution or not using a computation that is simpler than solving the LCP. So, a very simple computational method adapted to resolve the LCP could just test each of the $3^m$ candidate solutions until it finds one that satisfies the test. While this naïve approach conceptually illustrates the conventional "active set" methods, it is not really a practical approach to the resolution of LCPs. This becomes clear when a worst case scenario is considered in which $3^m-1$ candidate solutions are checked before a solution is found. More particularly, consider a problem size similar to those effectively resolved by the present invention, e.g., where m=10,000 a worst case number of tests would equal $3^{10,000}$, or $1*10^{4,771}$. If each test takes 1 ms to perform, then the computational method would take $5*10^{4,751}$ billion years to resolve the worst case scenario.

The reason there are $3^m$ candidate solutions for a boxed LCP is that one of three conditions must hold for each of the m row constraints. These conditions are referred to as "clamped high", "clamped low" and "unclamped." Each one of the $3^m$ candidate solutions may be assigned a unique label by specifying which of the three conditions hold for each of the m row constraints. For example, for an LCP with m=2, one possible label is (clamped high, unclamped). Such a unique label defines an active set.

Active set methods are similar to the naive method described earlier in that they test selected candidate solutions from the collection of $3^m$ candidate solutions until a solution is found. However, unlike the naive method, active set methods do not search through the collection of candidate solutions sequentially. At each step, active set computational methods use the label associated with the "current" candidate solution under consideration to determine which candidate solution to test next.

Usually a heuristic is used to determine the next candidate solution to try given the label of the current candidate solution. Although the heuristics are chosen so that a small number of candidate solutions are tested in an average scenario, in a worst case scenario it is still necessary to test all of the $3^m$ candidate solutions.

In practical applications of a physics engine, the number of candidate solutions subject to testing is limited. This is particularly true where the maximum LCP resolution time is defined in relation to the frame rate of a real-time display. Accordingly, where the maximum resolution time is reached before resolution of the LCP, conventional active set methods typically use the last candidate solution tested as the solution. Unfortunately, with active set methods there is no guarantee that the next candidate solution will be any closer to the solution than the last candidate solution. Thus, if the search is terminated prematurely there is no guarantee that the candidate solution returned by the method will be anywhere close to the solution. Even worse, if the active set computational method is repeated with more iterations, there is no guarantee that the new solution will be any better than the original.

Another problem associated with active set methods is that each test typically involves a number of large ($m^3$) matrix operations. That is, if m=10,000, then the number of operations per iteration is proportional to $10,000^3$, or one trillion. Although a designer has control over the run time of the method by varying the maximum number of iterations allowed, this is a very coarse control mechanism due to the large quantity of time taken by each iteration. Active set methods often require expensive data permutation such as principle sub-matrix operations. These data permutations make active set methods especially unsuitable for hardware implementation.

In contrast, our projected iterative descent method guarantees that every iteration will move the current candidate solution closer to a final solution. The more time a designer is able (or willing) to allocate to an LCP solver incorporating the method of the present invention, the better the final solution provided by the solver. A designer may choose to hold the number of iterations constant and let the quality of the solution vary, or hold the required quality constant and let the solution time vary.

Further, the number of operations performed per iteration by a method designed in accordance with the present invention is not related to m, and is relatively small—generally less than a hundred. This allows a system designer very fine grained control over the trade-of between speed and quality.

Consider the conventional active set method used by the Open Dynamics Engine noted above. This method is an extension of Dantzig's method and makes use of the following three active sets:

$N^-=\{(f,u)|u>0, f=\text{lo}\}$, $N^+=\{(f,u)|u<0, f=\text{hi}\}$, and $C=\{(f,u)|u=0, \text{lo}<f<\text{hi}\}$.

It can be shown mathematically that the computational use of these active sets is the equivalent of the LCP "boxed" (i.e., limiting) conditions shown below in equations (4) through (7). It is common to express the data defining a rigid body dynamics problem in matrix form. A matrix can be thought of as a collection of related data that expresses in mathematical terms the conditions defining an animation. That is, a matrix (or group of matrices) contains all the data sufficient to define the nature and characteristics of the objects, forces, and constraints making up an animated world space. It is common within this context, particularly in relation to constraints, to group closely related data into a matrix row, or a set of adjacent matrix rows.

Continuing with the ODE example, if a data row is found in any one of three active sets, a solution can be found that accurately defines the position and motion of an object related to the row of data. An accurate solution will properly account for all of the limiting conditions applied to objects in the animated world space. Thus, the ODE solver attempts to resolve the LCPs defining the position and motion of rigid bodies in an animated world space by placing all of the resulting data rows into one of the three active sets. The computational method works row by row sequentially defining each row as a "working row," and trying to solve each working row by properly placing it into one of the active sets.

Unfortunately the solving process is not at all straightforward due to the complexities introduced by the box conditions. (Recall that these box conditions arises from mathematical expressions of constraints placed upon the objects in the animation). Because of these complexities, the act of solving for a particular working row often requires a large re-working of sorts for previously resolved rows. In effect, previously resolved rows may need to the transferred between the three active sets in order to properly solve each new working row. This result creates a situation where the computational method used by the ODE solver to resolve LCPs actually runs in a non-linear manner.

Each transfer of a row between active sets requires resolution of another linear system. Solving a linear system can be a very time consuming process. Additionally, conventional approaches to LCP resolution require the definition (i.e., construction), storage, and mathematical use of very large, very dense matrices. For example, a very large system matrix A must be explicitly constructed and stored in memory. These large, complex data forms are thereafter used in computational operations. As a result, huge matrix/vector multiplication operations must be repeatedly performed. Little wonder active set approaches to LCP resolution are incapable of acceptable performance within a real-time display system.

The foregoing discussion is drawn to the ODE solver, as an illustrative example. However, all computational methods relying on the use of active sets are similarly handicapped. Each variously requires resolution of a linear system during each iteration, explicit construction and storage of system matrices, and/or complex computational operations. In contrast, the present invention does not suffer such disabilities. Lacking such time and memory space consuming requirements, a computational method defined according to the present invention is able to run in real-time while providing accurate resolution of LCPs, like those arising from the display of rigid body dynamics.

Calculating the motion of objects, such as rigid bodies, subject to bilateral constraints (e.g., joints, etc.) as well as unilateral constraints (e.g., friction, gravity, etc.) is one of the most time consuming, resource demanding, and intellectually challenging aspects of real-time, physics-based animations. Simply put, conventional approaches are too slow and too unreliable to create complex, real-time, realistic looking animations. As noted above, a collection (one or more) of rigid bodies (moving or at rest) and a collection of forces acting upon the rigid bodies can be effectively modeled as a set of bounded quadratic minimization problems, which when expressed with appropriate constraints are more routinely referred to as Linear Complementary Problems (LCPs).

LCPs are not exclusively found in physics-based animations. For example, LCPs find routine application in the field of economics. Multiple conventional algorithms have been applied to the resolution of LCPs across a number of technical fields.

In contrast to the active set methods previously used, the present invention makes use, at least in one presently preferred embodiment, of a "projected iterative descent" method. The term "gradient projection" might also be used to described the presently preferred method for resolving physics-based LCPs.

As noted above, the resolution of active set methods is too slow because permutation of the working sets occurs slowly. For each iteration, at most one constraint (i.e., working row) is added to or dropped from an active set. Thus, if there are relatively few constraints active in an initial candidate solution for an LCP, yet there are many constraints active in the final solution, then numerous mathematical iterations are required to "converge" from the initial candidate solution to an accurate final solution. So, if the composition of an active set at a starting point in a large LCP is vastly different from its composition at the final solution, convergence will be slow. What is needed is a computational method that allows a working solution to undergo radical changes, if necessary, during each iteration, and/or a resolving computational method that doesn't require explicit maintenance of working set(s).

The present invention makes use of such a computational method. A number of exemplary, projected iterative descent methods for solving LCPs related to physics-based data are described more fully hereafter.

Returning to the description of an exemplary LCP, and assuming a square "system matrix", A, having "n by n" elements, and a real n-dimensional vector b (unconstrained velocities) (hereafter vectors are shown in bold text), the complementarily problem consists of finding the n-dimensional vectors x (forces) and u (velocities) that satisfy the conditions shown in equations (1) and (2) below.

$$A_{n \times n} x_{n \times 1} + b_{n \times 1} = u_{n \times 1} \quad (1)$$

$$u_i \geq 0, x_i \geq 0, u_i x_i = 0, f \text{ or } \forall i \in 1, 2, \ldots, n \quad (2)$$

The LCP problem is given by the notation LCP(b,A).

As introduced above, a generalization of the LCP often used in rigid body dynamics is the boxed LCP. The boxed LCP problem starts from the definition of the standard LCP and adds two, additional n-dimensional limits lo and hi, the lower and upper bounds respectively, such that the following equations (3) through (7) below hold true. The lo and hi limits may be viewed as force boundaries or thresholds defined in relation to the specific physical phenomena applicable to a physics-based animation. U.S. patent application Ser. No. 2003/0179205 to Smith et al. published Sep. 25, 2003, the subject matter of which is hereby incorporated by reference, describes one method by which lo and hi are selected.

$$Ax+b=u \text{ for } \forall i=1, \ldots, m, \quad (3)$$

$$lo_i \leq x_i \leq hi_i \quad (4)$$

$$x_i = lo_i \Rightarrow u_i \geq 0 \quad (5)$$

$$x_i = hi_i \Rightarrow u_i \geq 0 \quad (6)$$

$$lo_i < x_i < hi_i \Rightarrow u = 0 \quad (7)$$

System matrix A may be defined as $A = JM^{-1}J^T$, where J is the Jacobian ($1^{st}$ derivative) calculated from the constraints, and M is the matrix of mass and moment of inertia for the objects in the system. Solving a LCP is essentially a problem of finding a solution to a linear system that satisfies the foregoing inequality and complementarity constraints The explanation that follows draws upon a useful mathematics tool called "data refinement." See, C. C. Morgan and P. H. B. Gardiner, "Data refinement by calculation," *Acta Informatica*, 27: 481–503, (1990). As will be seen below, data refinement may be used in several exemplary embodiments to progressively refine a more general computational method applicable to LCPs into a computational methodology adapted to the efficient resolution of rigid body dynamics. Accordingly, the present invention is described in some additional detail below within the context of a projected Gauss-Seidel LCP solver adapted to large scale, real-time, rigid body dynamics simulation. A description of the general Gauss-Seidel method may be found at R. W. Cottle et al., "The Linear Complementarity Problem," *Academic Press*, Boston, (1992).

For purposes of illustration, a problem addressed by the present invention is one of accurately predicting or modeling the position and motion of "n" bodies, where one or more of the bodies have "m" degrees of freedom limited by constraints. Mathematically, this problem and its constituent data components may be expressed as a collection of matrix-arranged "row constraints," where each joint or contact defines a constraint connecting (i.e., relating) two objects. FIG. 2 illustrates a single row constraint 20 selected from a collection of data expressing mathematically the physical relationship between a number of objects and related constraints. That is, if one is given a set of objects having assigned properties like mass and size, and a set of constraints (i.e., a set of rules defining how objects can move), a mathematical matrix (or collection of matrices) of descriptive data can be developed wherein row-wise values describe an object in one degree of freedom. (FIG. 2 only illustrates a row constraint related to data for x, u, b, and J. This collection of data is merely exemplary, not fully inclusive).

The full collection of physically descriptive "physics-based" data is modeled as a LCP having the form LCP(b,A), where "system matrix" A is defined as $A = JM^{-1}J^T$, where Jacobian J is an "m" by "6 n," sparse matrix having two sets of 6 contiguous nonzero elements per constraint row, and Mass Matrix M is a "6 n by 6 n" block diagonal matrix with block size 6. System matrix A, which need not be explicitly calculated in the present invention, is preferably an "m by m" symmetric, positive, semi-definite matrix.

In one aspect, the present invention is said to be "projected," i.e., computationally applied to a LCP. In another aspect, the present invention is said to be "iterative." Generally speaking, iterative computational methods may be viewed as methods in which a candidate solution is progressively refined until it becomes sufficiently close to the final solution of the problem. In another aspect, the present invention is said to be a "descent method" in that each iteration is guaranteed to take a current candidate solution closer to the final solution. Certain iterative computational methods are derived by considering "splittings" of the system matrix. As applied to a system matrix A, pair (B,C) is called a splitting of A, if A=B+C. For further background in matrix splitting algorithms and their application to LCPs, see the text by R. W. Cottle et al., *The Linear Complementarity Problem*, Academic Press, Boston (1992).

Figure 3:
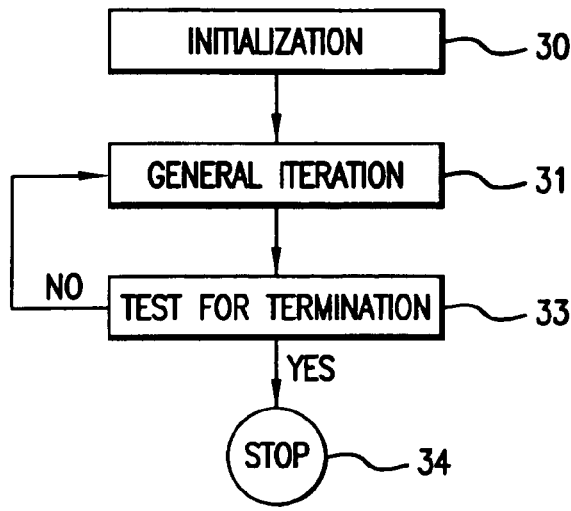
FIG. 3 is a general flowchart illustrating one embodiment of the present invention; and, FIG. 4 is another flowchart illustrating another embodiment of the present invention.

The "projected", "iterative" and "descent natures of the present invention are further illustrated in the exemplary computational method described with respect to FIG. 3. The method shown in FIG. 3 is applied to splittings of LCP(b,A).

In the following example, a computational method is derived for a standard LCP. A modification gives the derivation for a boxed LCP. During an Initialization step 30, $f^O$ is defined as an arbitrary, non-negative vector, where x is set to 0. A general iteration step 31 is defined as a computational, wherein for a given $f^X \geq 0$, LCP ($b+Cf^X$, A) is solved by letting $f^{X+1}$ be an arbitrary solution. During a Test for Termination step 33, a determination is made as to whether $f^{X+1}$ satisfies a prescribed stopping rule, and if "Yes" then the method terminates, but if "No" the method returns to step 31 after incrementing a time step.

Different choices of the matrix splitting (B,C) lead to a different selection of the computational method applied to solving LCP(b,A). Where B is selected such that B=L+D, where L and D are, respectively, the strictly lower triangular and diagonal parts of A, and where the components of the iterate $f^{X+1}$ are given recursively by, $$f_i^{X+1} = \max\left(0, f_i^X - a_{ii}^{-1}\left(b + \sum_{j<i} a_{ij} f_j^{X+1} + \sum_{j \geq i} a_{ij} f_j^X\right)\right), i = 1, \ldots, m, \quad (8)$$

the resulting computational method is a projected iterative decent method based on the Gauss Seidel algorithm.

The following pseudo-code is illustrative of a simple programming method adapted to implement a projected Gauss Seidel algorithm with fixed (maximum number) iterative steps ("numIterations"):

PSEUDO CODE EXAMPLE 1

```
f, x := 0, 0
while x ≠ numIterations
    i:=0
    while i ≠ m
        f_i := max(0, f_i - a_ii^-1(b_i + (Af)_i))        (9)
        i := i + 1
    endwhile
    x := x + 1
endwhile
```

As can clearly be seen in equation (9) above, the projected iterative descent method is most computationally intense (or "dominated" by) the repeated multiplication of system matrix A by f. Thus, in so far as the this computational step can be simplified or reduced in iteration, the speed with which the LCP is resolved will be increased. Within the context of the present invention, the particular structure of system matrix A may be exploited by introducing an auxiliary variable which will significantly reduce the cost of the dominate computation noted above.

Although system matrix A is actually the mathematical product of three separate matrices, it is convenient to express A as the product of Jacobian, J, and the transpose of a "Jacobian/Mass" matrix $J^M$, where $J^M$ is defined as the product of J and the mass-inertia matrix $M^{-1}$, or $$A = J*(J^M)^T, \text{ where } J^M = J*M^{-1} \quad (10)$$

A new vector variable "v" preferably having a size of "6 n" and referred to as an "auxiliary variable" is now introduced. A coupling invariant defines auxiliary variable v in terms of Jacobian/Mass matrix $J^M$ and the candidate solution f, as follows:

$$v = (J^M)^T f. \quad (11)$$

Auxiliary variable v may be thought of (i.e., interpreted) as the velocity of an object in animated world space. Rewriting equation (11) above (and remembering that $M^{-1}$ is symmetric) yields:

$$v = M^{-1}*(J^T f), \quad (11')$$

where $J^T f$ is the impulse applied to enforce the constraints. Of note in this particular example, the proper choice of coupling invariant dramatically improves the efficiency of a computational method designed in accordance with the present invention.

Pseudo-Code example 1 above may be modified as follows to incorporate the use of auxiliary variable v defined by the coupling invariant.

PSEUDO-CODE EXAMPLE 2

```
f, v, x := 0, 0, 0
while w ≠ numIterations
    i := 0
    while i ≠ m
        f_i := max(0, f_i - a_ii^-1(b_i + (Jv)_i))        (12)
        v := (J^M)^T f                                    (13)
        i := i + 1
    endwhile
    x := x + 1
endwhile
```

The term $(b_i+(Jv)_i)$ in the computational step above also has a physical interpretation, i.e. constraint space velocity for a current constraint row i, or more correctly the rate of change of the constraint violation for row constraint i. Considering that only one element of f changes per iteration, auxiliary variable v can be updated in an incremental way. This recognition allows the working Pseudo-Code example to be further optimized as shown below.

PSEUDO-CODE EXAMPLE 3

```
f, v, x := 0, 0, 0
while x ≠ numIterations
    i := 0
    while i ≠ m
        newf := max(0, f_i - a_ii^-1(b_i + (Jv)_i))       (14)
        v := v + (J^M)_i^T(newf - f_i)                    (15)
        f_i := newf
        i := i + 1
    endwhile
    x := x + 1
endwhile
```

As can be seen from (15) above, "newf" is an intermediate value that will be assigned back into the current candidate solution "$f_i$". The term "newf-$f_i$" is thus used to incrementally update auxiliary variable v. Of note, equation (13) in Pseudo-Code example 2 requires the multiplication of a large matrix $J^M$ (size=6 n by m) with a large vector, candidate solution f (size=m). However, use of auxiliary variable v allows equation (15) in Pseudo-Code example 3 to replace this complex multiplication step with a small vector scaling and addition. Replacement of the complex, large-matrix by large vector multiplication step with a simple, scaled vector addition step, (newf–f$_i$), greatly reduces the number of floating point operations required to compute each iteration.

The projected iterative descent method according to the present invention may be further optimized by taking advantage of the sparsity of the constituent matrices forming much of the physics-based data expressed in the LCP. The Jacobian J and the Jacobian/Mass matrix $J^M$ are ready examples of sparse matrices. It is convenient to consider each row of J and $J^M$ as a matrix of "1 by 6" data blocks, or $$J_i=(J)_i=[J_{i1}\ J_{i2}\ \ldots\ J_{in}], i=1,\ldots,m \quad (15)$$

$$J_i^M=(J^M)_i=[J_{i1}^M\ J_{i2}^M\ \ldots\ J_{in}^M], i=1,\ldots,m \quad (16)$$

where $J_{ij}$ and $J_{ij}^M$ are 6 vectors, i and j denoting rows and columns respectively. For the physics-based data typically operated upon by the computational method according to the present invention, each row of J has at most 2 nonzero blocks, i.e. at most two of $J_i$,j=1, . . . n are not zero.

We will now introduce variables $J^C$ and $J^{MC}$ to hold "compressed" representations of J and $J^M$, respectively. Variables $J^C$ and $J^{MC}$ are matrices with as many rows as Jacobian matrix J, but with only 12 columns—the 12 columns being organized as 2 blocks of 6 columns. Thus, each row of the "compressed Jacobian matrix" $J^C$ and "compressed Jacobian/Mass matrix" $J^{MC}$ will only store the two nonzero blocks of the corresponding row of Jacobian matrix J and $J^M$, as shown below:

$$J^C = \begin{bmatrix} J_{11}^C & J_{12}^C \\ J_{21}^C & J_{22}^C \\ \vdots & \vdots \\ J_{m1}^C & J_{m2}^C \end{bmatrix} \quad (17)$$

$$J^{MC} = \begin{bmatrix} J_{11}^{MC} & J_{12}^{MC} \\ J_{21}^{MC} & J_{22}^{MC} \\ \vdots & \vdots \\ J_{m1}^{MC} & J_{m2}^{MC} \end{bmatrix}$$

where $J_{ij}^C$ and $J_{ij}^{MC}$ are 6 vectors.

An index function I, where I=[1 . . . m]×[1, 2]→N, that yields the indices of the 2 non-zero blocks for each row is required at this point in the data refinement to relate J to $J^C$ and I and to relate $J^M$ to $J^{MC}$ and I. Using I as a notational shorthand of sorts allows the following abstraction function relating $J^C$ and I to J.

$$J_{ij} = \begin{cases} J_{i1}^C, & \text{if } j = I(i, 1) \\ J_{i2}^C, & \text{if } j = I(i, 2) \\ 0, & \text{otherwise} \end{cases} \quad (18)$$

Since the Jacobian/Mass matrix, $J_M$, has the same non-zero structure as Jacobian matrix, J, the following sparsity representation may be had for $J_M$, $$J_{Mij} = \begin{cases} J_{Mi1}^C, & \text{if } j = I(i, 1) \\ J_{Mi2}^C, & \text{if } j = I(i, 2) \\ 0, & \text{otherwise} \end{cases} \quad (19)$$

Pseudo-code Example 3 may be further refined using these abstraction functions as follows.

PSEUDO-CODE EXAMPLE 4

```
f, v, x = 0, 0, 0
while w ≠ numIterations
    i = 0
    while i ≠ m
        newf := max(0, f_i – a_ii^–1(b_i + J_i1^C • v_I(i,1) + J_i2^C • v_I(i,2)))   (20)
        v_I(i,1) := v_I(i,1) + (newf – f_i)(J_Mi1^C)^T                                  (21)
        v_I(i,2) := v_I(i,2) + (newf – f_i)(J_Mi2^C)^T                                  (22)
        f_i := newf
    endwhile
    x := x + 1
endwhile
```

Of note, the computational method illustrated in Pseudo-Code Example 4 includes an inner WHILE loop that takes a constant time interval for execution. Further the only substantial computation step consists of two (2), six-term-wide dot products and two (2), six-term-wide scaled vector additions. The index function I(i,:n) actually has a very clear physical meaning within the context of a physics-based animation—namely, the object IDs of the objects associated with the current constraint row. Practical implementations of a display system adapted to animate the movement of physics-constrained objects require use of a unique identification number (ID) for each object. By using the object ID within the foregoing index function, data associated with the object(s) may be efficiently retrieved from memory.

Within the context of the working example, this final refinement of the computational method allows LCP resolution using only 52 floating point operations ("flops") per constraint, per iteration. Furthermore, many of these flops may be executed in parallel, where appropriate hardware is provided. (See, for example, commonly assigned and concurrently filed U.S. patent application Ser. No. 10/815,721.

In real-time animations such as computer games, it is important that the computation of each animation frame (i.e., time step) take the same amount of time, or at least occur within a predetermined maximum amount of time. This condition allows the animation to proceed with a constant frame rate which gives a smooth quality to the animation. For this reason and unlike the generic computational method illustrated in FIG. 3, the methods illustrated by Pseudo-Code examples 1 through 4 do not perform a termination test. Instead, each of these exemplary methods uses a fixed (maximum) number of outer loop iterative steps, as defined by the value of "numIterations."

However, this approach may cause variations in the overall quality of the LCP solution on a frame by frame basis. Where such frame by frame variations in quality are unacceptable, an additional evaluation on termination step or condition may be added. The following Pseudo-code example shows how a further modification of Pseudo-code Example 5 can accomplish this.

PSEUDO-CODE EXAMPLE 6

```
f, v, x = 0, 0, 0
                    // Find initial maximum unclamped velocity
max_u = 0
i=0
while i ≠ m
    if ((f_i = lo_i ∧ b_i < 0) ∨ (fi = hi_i ∧ b_i > 0) ∨
        (f_i < hi_i ∧ f_i > lo_i ∧ |b_i| > Thres)) ∧ |b_i| > max_u      (23)
        max_u = |b_i|
    endif
    i := i + 1
endwhile
while (Thres < max_u)
    i = 0
    max_u = 0
    while i ≠ m
        u_i = b_i + J_{i1}^C • v_{I(i,1)} + J_{i2}^C • v_{I(i,2)}         (24)
        newf := med(lo_i, f_i − a_{ii}^{−1} * u_i, hi_i)                 (25)
        v_{I(i,1)} := v_{I(i,1)} + (newf − f_i)(J_{Mi1}^C)^T
        v_{I(i,2)} := v_{I(i,2)} + (newf − f_i)(J_{Mi2}^C)^T
        f_i := newf
        if (( f_i = lo_i ∧ u_i < 0) ∨ (fi = hi_i ∧ u_i > 0) ∨
            (f_i < hi_i ∧ f_i > lo_i ∧ |u_i| > Thres)) ∧ |u_i| > max_u   (23)
            max_u = |u_i|
        endif
    endwhile
end while
```

The termination condition evaluation in the foregoing method is based on boxed LCP conditions defined by equations (4) to (7) above. However, any similar conditions might be used in accordance with a competent termination test for a particular computational method.

To summarize the foregoing in selected illustrative aspects, the present invention uses a projected, iterative descent method to solve LCPs formed from physics-based simulation data. A projected Gauss-Seidel algorithm is described as a presently preferred embodiment.

In one related aspect, the projected iterative descent method is defined as having a fixed (or maximum) number of iterations. An outer WHILE loop is described as an example of a programming approach adapted to define the fixed number of computational iterations that ensures that a LCP computation occurs within a predetermined time step duration. Alternatively, a test for termination condition may be incorporated within the computational method.

In another related aspect the projected iterative descent method is refined using an auxiliary variable and coupling invariant to improve overall computational efficiency. With use of a properly selected coupling invariant and a corresponding definition of auxiliary variable, one or more dominate calculation step(s) within the method may be expressed as a relatively simple mathematical calculation—a constant length, scaled vector addition in the foregoing example.

In yet another related aspect, the sparse nature of the physics-based data forming the LCP can be exploited to further simplify the calculations necessary for LCP resolution. Simplified expressions of commonly occurring matrix data forms allows effective use of one or more index functions. Where such index functions define data forms of fixed size, a computational method of fixed duration may be clearly defined.

As noted throughout, one important object of the present invention is the definition of efficient computational methods adapted to solve LCPs related to rigid body dynamics, such that real-time animations are possible. In other words, it is not sufficient to merely develop new computational methods that accurately solve LCPs arising from physics-based data. The computational methods must also operate with sufficient speed to enable real-time animations.

Thus, in the context of physics-based animations, every effort should be made to critically assess the nature of the data mathematically expressing the animated physical circumstances. Such assessment is made in relation to practical implementation considerations, such as coding efficiency, data storage requirements, and data transport limitations.

For example, the computational methods illustrated in Pseudo-Code examples 5 and 6 may be further refined by critically assessing the nature of the constituent physics data. Upon consideration of these examples, one will note that the calculation of intermediate value "newf" requires repeated use of the system matrix A. System matrix A requires a large amount of memory for storage and is relatively slow to compute. However, only the inverses of the diagonal elements of system matrix A are required for the calculation of the scalar value newf These matrix data elements may be pre-calculated as a "system matrix related vector" and stored in memory as a data vector having length "m," thereby obviating the need to store and transfer the entire system matrix, A.

In similar form, the memory space required to store Jacobian J may be reduced by half. If we define a "reduced size matrix" $J_Q$ as $$J_Q = J * (M^{-1})^{1/2} \qquad (26)$$

it may readily be verify that $J_Q$ satisfies the relationship $$A = J_Q J_Q^T \qquad (27)$$

By replacing both Jacobian J and Jacobian/Mass matrix $J_M$ with respective, reduced size matrices having the form of $J_Q$, the computational method illustrated in Pseudo-Code example 6 may be improved as shown below in Pseudo-Code Example 7.

PSEUDO-CODE EXAMPLE 7

```
f, v, x = 0, 0, 0
while x < numIterations
    i = 0
    while i ≠ m
        newf := max(0, f_i − a_{ii}^{−1}(b_i + J_{Qi1}^C • v_{I(i,1)} + J_{Qi2}^C • v_{I(i,2)}))   (28)
        v_{I(i,1)} := v_{I(i,1)} + (newf − f_i)(J_{Qi1}^C)^T                                     (29)
        v_{I(i,2)} := v_{I(i,2)} + (newf − f_i)(J_{Qi2}^C)^T                                     (30)
        f_i := newf
    endwhile
    x := x+1
endwhile
```

By using the data form defined in equation (27), the computational method illustrated in Pseudo-Code example 7 will have the same convergence as the computational method illustrated in Pseudo-Code example 5. However, since the use of memory space within the context of the computational method illustrated in Pseudo-Code example 5 is dominated by the storage of matrixes J and $J^M$, use of matrices having the form of reduced sized matrix $J_Q$, instead of J and $J_M$, dramatically reduces this memory requirement imposed on a display system incorporating a rigid body dynamics engine using the computational method of the present invention. This is particularly apparent when one postulates the animation of next-generation, large scale systems in which values for "m" might rise to 15,000.

Of further note in relation to the computational method illustrated in Pseudo-Code example 7, auxiliary variable v is now (implicitly) defined as $$v = J_Q^T f \quad (31)$$

Obviously, this new auxiliary variable no longer has the same physical interpretation as that defined above with reference to equation (11). However, the new coupling invariant may be considered a weighted velocity of the simulated objects in animated world space, each object having the weight of $(M^{-1})^{1/2}$. Thus, this example of further optimizing a computational method in relation to its constituent data form(s) also serves to further illustrate the selection and definition of an effective coupling invariant.

Undoubtedly, the computational method illustrated in Pseudo-Code example 6 could be similarly optimized by using of a reduced size matrix data form.

In yet another approach, the foregoing computational methods may be further optimized by the incorporation of one or more row filtering techniques.

Observing the exemplary methods illustrated in Pseudo-Code examples 5, 6, and 7, one will note that for each outer iterative loop (i.e. the WHILE loop in each of the given examples), the computation must iteratively run through each one of "m" constraint rows (i.e., up to 15,000 rows for a large scale simulation). However, during each iteration, there might be a great numbers of constraint rows already converging or remaining largely unchanged from the previous iteration (or a set of previous iterations). In such circumstances, the calculation on these constraint rows will not significantly contribute to the process of converging to the final solution. Nevertheless, the calculation of these "non-contributing" constraint rows requires the expenditure of considerable computational resources.

This observation is true for changes in both $v_{I(i,1)}$ and $v_{I(i,2)}$ in a constraint row i. See, equations (21) and (22) in Pseudo-Code example 5 or equations (29) and (30) in Pseudo-Code example 7. Where during the update of auxiliary variables (i.e., velocity components) $v_{I(i,1)}$ and $v_{I(i,2)}$ the difference between a new value and a previous value falls below a predetermined threshold, calculation of the constraint row is skipped in the current iteration.

To ensure this kind of row filtering is not to be too aggressive before the iteration finally converges, constraint rows that haven't satisfied the boxed LCP condition are processed during the following iteration. Another exemplary computational method, illustrated below as Pseudo-Code example 8, may be defined by incorporating a row filtering technique as well as reduced sized matrix data forms into the method illustrated in Pseudo-Code example 6. Within this example, an array "new_v_tag" is used to store tags for all objects, such that for each object a determination may be made as to whether an iteration-wise change in v exceeds a predetermined threshold "Thres." Initially all changes in v are considered greater than "Thres", i.e. a value of "1" is assigned to each entry in array new_v_tag

PSEUDO-CODE EXAMPLE 8

```
// initialization
f, v, x = 0, 0, 0
new_v_tag = 1
                // Find initial maximum unclamped velocity
max_u=0
```

-continued

```
i=0
while i≠ m
    if    (f_i = lo_i ∧ b_i < 0) ∨
          (f_i = hi_i ∧ b_i > 0) ∨
          (f_i < hi_i ∧ f_i > lo_i ∧|b_i| > Thres)) ∧|b_i| > max_u     (25)
          max_u = |b_i|
    endif
    i:=i+1
endwhile
        // If max_u remains above threshold, continue iterating
while (Thres < max_u)
    i = 0
    max_u = 0
        // Remember tags from last (i.e. previous) iteration
    cur_v_tag = new_v_tag
        // Clear tags for current time step
    new_v_tag = 0
    while i ≠ m
        // If both the two objects have small changes, skip this row
        if !(cur_v_tag[I(i,1)] || cur_v_tag[I(i,2)])      (32)
            continue to next i = i + 1
        endif
        u_i = b_i + J_Qi1^C • v_I(i,1) + J_Qi2^C • v_I(i,2)      (33)
        newf := med(lo_i,f_i - a_ii^-1 * u_i,hi_i)
        Δv = (newf - f_i)(J_Qi1^C)^T      (34)
        // Check if object I(i,1)'s v has large change
        if ||Δv||_∞ > Thres
            // Set tag for object I(i,1)
            new_v_tag[I(i,1)] = 1
        endif
        v_I(i,1) := v_I(i,1) + Δv      (35)
        Δv = (newf - f_i)(J_Qi2^C)^T      (36)
        // Check if object I(i,2)'s v has large change
        if ||Δv||_∞ > Thres
            new_v_tag[I(i,2)] = 1
        endif
        v_I(i,2) := v_I(i,2) + Δv      (37)
        f_i := newf
        // Check LCP boxing conditions (4)–(7).
        If checked row constraint isn't clamped
        update the maximum undamped |u_i|
        if ((f_i = lo_i ∧ u_i < 0) ∨ (fi = hi_i ∧ u_i > 0) ∨
           (f_i < hi_i ∧ f_i > lo_i ∧|u_i| > Thres))
            if|u_i| > max_u
                max_u = |u_i|
        endif
        //If checked row constraint doesn't satisfy the
            conditions, calculate the row anyway during next
            iteration
        new_v_tag[I(i,1)] = 1
        new_v_tag[I(i,2)] = 1
        i: = i + 1
    endwhile
endwhile
```

In the foregoing example, convergence is determined in relation to the LCP boxing conditions and convergence threshold value, and in satisfaction of the termination condition, (max_u<Thres) for maximum|u_i|. Where this termination condition is satisfied, we may also conclude that all row constraints satisfy the LCP boxing conditions and terminate the computational method. Of note, the minimum change threshold value, Thres, may be defined in accordance with a desired trade-off between accuracy and speed of the computational method. If more accurate (or precise) result is required, then the convergence threshold should be selected to be relatively small. On the contrary, a relatively larger convergence threshold will speed convergence. As compared with an similar test case run using a computational method like that illustrated in Pseudo-Code example 6, absent the benefit of row filtering (i.e., incorporation of threshold testing $\Delta v_{I(i,1)}$<Thres and $\Delta v_{I(i,2)}$<Thres), test results show that incorporation of row filtering allows up to a five fold performance improvement.

A recent test case was run successfully in real-time using a computational method like the one illustrated in Pseudo-Code example 8. This test case included animation of 888 rigid bodies (i.e., n=888), 5170 contacts, and a resulting 15,510 constraint rows (i.e., m=15,510). The convergence threshold, "Thres", was set at 0.01.

In one presently preferred embodiment, row filtering is indirectly implemented within competent computational methods adapted to solve LCPs using two bit tables having "n" entries (i.e. one bit per body), instead of bit tables having m entries (i.e. one bit per constraint row). This further refinement significantly simplifies the implementation of computational methods like the one illustrated in Pseudo-Code example 8.

Thus far in this written description, the foregoing exemplary embodiments of a computational method defined in accordance with the present invention have been presumptively run using a conventional display system like the one conceptually illustrated in FIG. 1. That is, a physics effects engine 5 running on display system hardware 7 may fully incorporate a rigid body dynamics engine 6 running a computational method defined in accordance with the present invention. The display system hardware may take any one of many conventional forms, including a general micro, mini, or mainframe computer, or a gaming console, or similar device. The rigid body dynamics engine incorporating a computational method defined in accordance with the present invention will operate in sympathy with, and typically under the control of, main application 4.

Figure 4:
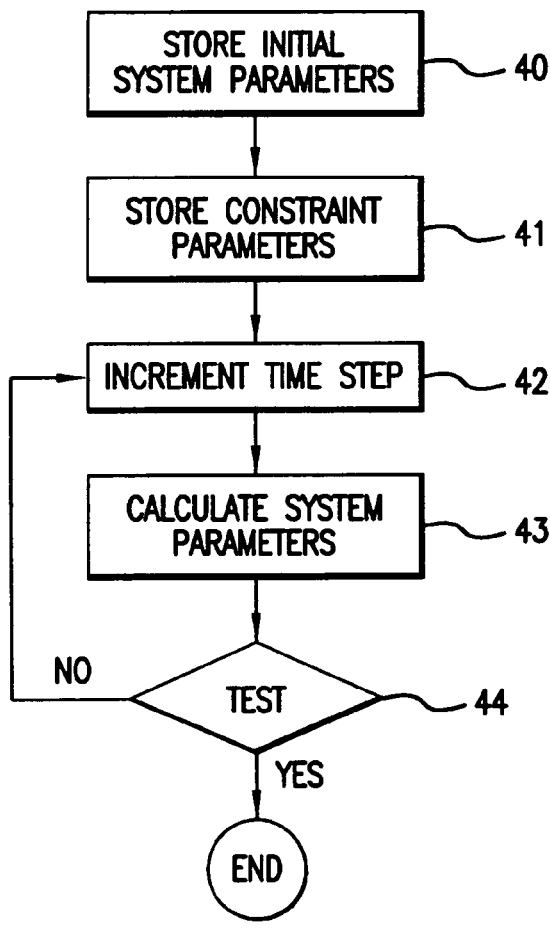

In general flow, as illustrated in FIG. 4, a display system will store in memory an initial set of system parameters (40). System parameters may include, as examples, the size and position of a plurality of objects in an animation to be displayed, as well as their initial respective velocity, if any, and forces acting on one or more of the plurality of objects. The display system will also store an initial set of animation constraints (41). Taken collectively, the initial system parameters and constraints "physically" define an animation world space at an initial time step 0. Following initialization, the process of displaying a real-time, physics-based animation continues with incrementing the time step (42). Following each time step increment, one or more processors (i.e., one or more CPUs, containing one or more computational logic units) associated with the display system calculate and update system parameters in accordance with the defined constraints and the initial (or step-wise previous) state of the system parameters (43). Following calculation and update of the system parameters, a termination test is run (44). Where a termination condition is satisfied (YES), the method stops. Where the termination condition remains unsatisfied, the method returns to increment the time step (42).

Typically, main application 4 will provide an initial object data array and constraint data array. This data will be integrated by operation of the main application and/or the physics engine to create a corresponding set of Jacobians, calculate the mass and inertia matrix, system matrix, and related constituent data components, including forces initially acting upon objects in world space.

Following calculation and integration of "updated" system parameters in accordance with the present invention, system parameter values calculated by the physics engine may be exported to the main application, a peripheral device, and/or external memory as part of a related method implementing the actual visual display. Thus, while not shown in FIG. 4, the conventional steps required to visually display the position and movement of objects within the animated world space are implicit in the application of the present invention.

A computational method defined in accordance with the present invention may also be efficiently executed on a display system incorporating a separate, hardware-based Physics Processing Unit. Such a display system is described using relevant teaching embodiments in provisional U.S. Patent Application 60/507,527 filed Oct. 2, 2003 and related non-provisional patent application Ser. Nos. 10/715,459; 10/715,370; and 10/715,440 all filed Nov. 19, 2003. The collective subject matter of these commonly assigned, pending U.S. patent applications is hereby incorporated by reference.

When the computational method according to the present invention is run on a display system incorporating a dedicated PPU, the method is preferably resident in the PPU and runs on the PPU in response to commands received from a corresponding CPU. Indeed, once initial system parameters are communicated from the host CPU to the PPU, rigid body dynamics may be calculated in the PPU largely independent of CPU operation, thereby freeing the CPU from the burden of physics-related data computations. Both the CPU and PPU are termed processing units.

The foregoing examples are just that—examples. They teach the implementation and use of the present invention as presently preferred, but do not strictly limit the scope of the invention. Instead, the scope of the present invention is defined by the claims.

What is claimed is:

1. A method of operating a display system having a display, a processing unit, and a memory, the method adapted to display an animation of n objects subject to motion in m constrained degrees of freedom on the display and comprising:
   defining and storing system parameters in memory, wherein the system parameters define a plurality of objects and at least one constraint acting upon an object in the plurality of objects;
   incrementing a time step;
   after incrementing the time step, calculating updated system parameters in the processing unit using a projected iterative descent method applied to one or more Linear Complementarity Problems (LCP) defined in relation to the system parameters, wherein the projected iterative descent mettnod comprises a step of testing for termination; and,
   wherein the animated motion of the objects is determined in relation to the updated system parameters.

2. The method of claim 1, wherein the step of defining and storing system parameters comprises:
   defining the LCP with a form LCP(b, A), where system matrix A is equal to the product of $JM^{-1}J^T$, where Jacobian J is a m by 6 n spares matrix having two sets of six contiguous nonzero elements per row, and where Mass matrix M is a 6 n by 6 n block diagonal matrix.

3. The method of claim 2, wherein the projected iterative descent method comprises a modified version of the Gauss-Seidel method.

4. The method of claim 1, wherein the step of testing for termination within the projected iterative descent method comprises determining whether a fixed maximum number of iterations have been performed.

5. The method of claim 3, wherein the step of testing for termination within the projected iterative descent method comprises determining whether a fixed maximum number of iterative steps.

6. The method of claim 1, wherein the projected iterative descent method is defined in relation to a coupling invariant selected in relation to a LCP data form and defining an auxiliary variable, such that when used within the projected iterative descent method the auxiliary variable reduces the overall mathematical complexity required to calculate the updated system parameters.

7. The method of claim 3, wherein the modified Gauss-Seidel method is implemented using an auxiliary variable, v, selected in relation to a coupling invariant and the form of system matrix A;

wherein v is defined as the product of a transposed Jacobian/Mass matrix, $J^M$, and a candidate solution vector, f.

8. The method of claim 6, wherein the auxiliary variable comprises a variable accurately interpreted as a velocity associated with one or more of the n objects.

9. The method of claim 7, wherein the auxiliary variable is equivalent to the product of an impulse force associated with a constraint and a mass matrix corresponding to one or more of the n objects.

10. The method of claim 6, wherein use of the auxiliary variable results in a dominant mathematical calculation of the projected iterative descent method being expressed as a scalar operation.

11. The method of claim 10, wherein the scalar operation comprises a scaled vector addition.

12. The method of claim 7, wherein Jacobian J and Jacobian/Mass matrix $J^M$ are respectively defined in a compressed data matrix form within the projected iterative descent method.

13. The method of claim 12, wherein the compressed data matrix form consists essentially of a number of rows equal to the number of rows found in J or $J^M$, respectively, but only twelve columns.

14. The method of claim 7, wherein the projected iterative descent method comprises a fixed maximum number of mathematical operations.

15. The method of claim 14, wherein a dominate operation in the projected iterative descent method comprises two, 6-wide dot products, and two, 6-wide scaled vector additions.

16. The method of claim 1, further comprising:
after calculating the updated system parameters, performing the steps of testing for termination, wherein the step of testing for termination comprises testing for a termination condition; and,
in accordance with a result of testing for the termination condition either ending the method, or returning to the step of incrementing the time step.

17. The method of claim 16, wherein the termination condition is defined in relation to boxed LCP conditions defining the LCP.

18. The method of claim 2, further comprising:
calculating a system matrix vector of fixed length from the inverses of the diagonal elements of system matrix A and storing the system matrix vector in memory; and,
using an incremented version of the auxiliary variable derived from the system matrix vector to reduce the overall mathematical complexity required to calculate the updated system parameters.

19. The method of claim 1, wherein the step of defining and storing system parameters comprises defining a collection of row constraints, each row constraint defining a relationship between at least two of the n object; and
within the step of calculating the updated system parameters further comprises testing each row constraint in the collection of row constraints in relation to a minimum change threshold during each iteration of the projected iterative descent method.

20. The method of claim 19, wherein the step of testing each row constraint in the collection of row constraints further comprises;
for each constraint row and during a current iteration in the projected iterative descent method, comparing a change in a system parameter for each constraint row to the minimum change threshold, and where the change falls below the threshold omitting the constraint row from mathematical computations during the current iteration.

21. A computer program adapted to control a display of simulated motion for objects interacting in accordance with a set of principals defining rigid body dynamics, wherein the program comprises an iterative method for solving a Linear Complementarity Problem (LCP) having a form LCP (b+Cf, A), C being a constant and f being an arbitrary candidate solution for each method iteration, wherein the LCP is derived from a data set related to the rigid body dynamics, the data set comprising a system matrix A, and the iterative method comprises:
assigning an arbitrary vector that lies within a feasible region defined between limits lo and hi, ($lo < f^0 < hi$), as an initial candidate solution $f^0$ for an initial iteration 0;
solving the LCP by defining a subsequent candidate solution $f^{X+1}$ for an iteration X+1, such that the subsequent candidate solution $f^{X+1}$ is always closer to a final solution for the LCP than a previous candidate solution $f^X$, for all $f^X$ greater than zero; and,
testing for termination.

22. The method of claim 21, wherein system matrix A comprises a splitting pair (B,C), where A=B+C, and B=L+D, where L is a strictly lower triangular part of system matrix A and D is a vector related to a diagonal element of system matrix A.

23. The method of claim 22, wherein system matrix A is equal to the product of $JM^{-1}J^T$, where Jacobian J is a m by 6 n sparse matrix and M is a 6 n by 6 n block diagonal matrix.

24. The method of claim 23, wherein the step of solving the LCP comprises recursively applying a modified Gauss-Seidel algorithm to data components in the data set.

25. The method of claim 24, wherein mathematical calculations inherent in the recursive application of the modified Gauss-Seidel algorithm are dominated by a step of multiplying system matrix A and a candidate solution vector $f_i$.

26. The method of claim 25, further comprising:
replacing the step of multiplying system matrix A and candidate solution vector $f_i$ with a scaled vector addition step by:
expressing system matrix A as Jacobian/Mass matrix $J^M$, where $J^M = M^{-1} * J^T$, where M is a mass matrix and J is a Jacobian;
defining an auxiliary variable v as $v = M^{-1} * (J^T f)$; and,
incorporating auxiliary variable v within the modified Gauss-Seidel algorithm.

27. The method of claim 21, wherein the step of testing for termination further comprises:
determining whether a fixed maximum number of iterations have been performed.

28. The method of claim 21, wherein the step of testing for termination further comprises:
determining whether a set of boxed LCP conditions have been satisfied.

29. The method of claim 21, wherein system matrix A is not explicating calculated.

30. The method of claim 29, and wherein at least one of Jacobian J, system matrix A and Jacobian/Mass matrix $J^M$ is expressed within the data set in a compressed data matrix form.

31. The method of claim 30, wherein the compressed data matrix form has a fixed size.

32. The method of claim 31, wherein the compressed data matrix form comprises a matrix having only twelve columns.

33. The method of claim 29, wherein system matrix A is functionally utilized within the iterative method in the form a fixed length vector defined in relation to the diagonal elements of system matrix A.

34. The method of claim 21, where the LCP is expressed in the data set as a plurality of row constraints, each row constraint being defined in relation to an object data array and a constraint data array in the data set;
wherein the step solving the LCP further comprises:
iteratively determining convergence for each constraint row in the plurality of constraint rows.

35. The method of claim 34, wherein the step of iteratively determining convergence for each constraint row in the plurality of constraint rows further comprises during each iteration:
filtering the plurality of constraint rows on a selected constraint row by selected constraint row basis in relation to a minimum change threshold; and
where a selected constraint row fails to meet the minimum change threshold, omitting that selected constraint row from the step of solving the LCP.

36. A computational method adapted for use within a computer program adapted to control the display of simulated motion for a plurality of dynamically interacting rigid bodies in conjunction with a memory, the computational method solving a Linear Complementarity Problem (LCP) derived from a data set, the data set being related to the plurality of dynamically interacting rigid bodies and a plurality of constraints defining limitations on the motion of the plurality of rigid bodies, the method comprising:
defining LCP data in memory from the data set;
solving the LCP by applying a projected iterative descent method to the LCP data; and,
testing for termination.

37. The method of claim 36, wherein the step of solving the LCP occurs during a fixed maximum time period, so as to allow real-time animation of the dynamic interaction of the plurality of rigid bodies on a display system.

38. The method of claim 36, wherein the LCP data comprises a plurality of row constraints, and wherein the fixed maximum time period is defined in relation to a fixed number of floating point operations, per constraint, per iteration.

39. The method of claim 36, wherein the step of testing for termination comprises determining whether a fixed maximum number of iterations have been performed.

40. The method of claim 36, wherein the step of testing for termination comprises determining whether a set of boxed conditions related to the LCP have been met.

41. The method of claim 36, wherein the step of solving the LCP comprises recursively applying a modified Gauss-Seidel algorithm to data components in the data set.

42. A system comprising, a Central Processing Unit (CPU), a dedicated Physics Processing Unit (PPU), a memory, and a plurality of peripherals including a display, the system adapted to animate motion of a plurality of objects on the display and comprising:
a program stored in memory, the program causing the system to perform the steps of:
by operation of the CPU, storing a data set in memory, where the data set defines physics-based characteristics for the plurality of objects, and an initial state of an animation of the plurality of objects;
storing constraint parameters in memory, where the constraint parameters define at least one constraint function constraining movement of at least one of the plurality of objects in the animation; and,
by operation of the PPU, calculating in the processing unit velocity and force parameters defining the state of the animation following a time step;
wherein the step of calculating the velocity and force parameters comprises applying a projected iterative descent method to the data set in accordance with the constraint parameters.

43. The system of claim 42, wherein the PPU comprises a dedicated co-processor.

44. The system of claim 43, wherein the dedicated co-processor is connected within the system by a PCI card.

45. The system of claim 42, wherein the CPU and PPU comprise respective processing cores in a multi-core processor.

* * * * *

UNITED STATES PATENT AND TRADEMARK OFFICE
CERTIFICATE OF CORRECTION

PATENT NO. : 7,079,145 B2 Page 1 of 1
APPLICATION NO. : 10/793899
DATED : July 18, 2006
INVENTOR(S) : Tonge et al.

It is certified that error appears in the above-identified patent and that said Letters Patent is hereby corrected as shown below:

In Column 22, Line 46, please replace "mettnod" with --method--.

In Column 22, Line 67, please replace "steps" with --steps have been performed--.

In Column 24, Line 40, please replace all instances of "6 n" with --6n--.

Signed and Sealed this

Twenty-third Day of December, 2008

JON W. DUDAS
*Director of the United States Patent and Trademark Office*